United States Patent
Douma

(10) Patent No.: US 6,233,633 B1
(45) Date of Patent: May 15, 2001

(54) DATA TRANSFER BETWEEN A COMPUTER AND A DIGITAL STORAGE DEVICE USING A COMPUTER SOUND CARD TO CONVERT THE PROCESSED DIGITAL DATA TO ANALOG FORM

(75) Inventor: Peter Douma, Wyckoff, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/035,685

(22) Filed: Mar. 5, 1998

(51) Int. Cl.[7] ................................................. G06F 13/10
(52) U.S. Cl. ........................ 710/69; 710/64; 710/74; 360/32
(58) Field of Search ............................... 341/61; 360/32; 369/25, 50; 386/117; 710/62, 64, 65, 69, 74

(56) References Cited

U.S. PATENT DOCUMENTS

| | | | |
|---|---|---|---|
| 4,794,468 | * 12/1988 | Murakoshi | 386/117 |
| 5,093,820 | * 3/1992 | Maeda et al. | 369/50 |
| 5,465,240 | * 11/1995 | Mankovitz | 369/1 |
| 5,490,018 | * 2/1996 | Yamashita | 360/32 |
| 5,519,395 | * 5/1996 | Buchler et al. | 341/61 |
| 5,587,977 | * 12/1996 | Murata | 369/25 |
| 5,612,943 | * 3/1997 | Moses et al. | 369/124 |
| 5,627,691 | * 5/1997 | Hong | 386/54 |
| 5,774,452 | * 6/1998 | Wolosewicz | 370/212 |
| 5,802,150 | * 9/1998 | Beck et al. | 379/93 |
| 6,005,501 | * 12/1999 | Wolosewicz | 341/52 |
| 6,020,880 | * 2/2000 | Naimpally | 345/327 |

* cited by examiner

*Primary Examiner*—Thomas Lee
*Assistant Examiner*—Thuan Du
(74) *Attorney, Agent, or Firm*—Frommer Lawrence & Haug, LLP.; William S. Frommer; Glenn F. Savit

(57) ABSTRACT

Data is transferred from a computer to a recording/reproducing device using a sound (audio) card installed in the computer with audio output ports for two channels coupled to the input of the recording/reproducing device. Without any additional changes to the hardware of a typical setup (a computer (desktop, portable, etc.), the sound card installed in the computer and two cables for the output of the sound card), the data is transferred to a player/recorder for recording, for example, information to a recording medium and reproducing the recorded information from the recording medium at any time.

17 Claims, 1 Drawing Sheet

DATA TRANSFER BETWEEN A COMPUTER AND A DIGITAL STORAGE DEVICE USING A COMPUTER SOUND CARD TO CONVERT THE PROCESSED DIGITAL DATA TO ANALOG FORM

BACKGROUND OF THE INVENTION

The present invention is related to data transfer operations and, in particular, to a system for transferring digital data from a computer to a digital data storage (recording) device, such as a minidisk recorder/player, using a computer sound card as an interface between the computer and the digital device.

With the increase of Internet usage as a source of audio information (fee-based or otherwise), data transfer operations between a personal computer (PC) and a recording device take on a more important role than ever. For example, users access the Internet via a PC or web devices available on the market and "browse the Web" by "surfing" for audio information. It may be possible for these users to transfer (download) audio information, such as songs or other musical recordings, from their favorite music Web sites on the Internet and record the downloaded audio information on recording devices (minidisk player or Video Tape Recorder (VTR), for example) for subsequent reproduction (namely, to listen to the song, etc).

While the above operations of obtaining musical recordings, etc. from the Internet may be just as costly as going to a record store and purchasing a disk or a digital audio tape by a favorite artist, the convenience of sitting at home and having the audio information at one's fingertips is unsurpassed. Hundreds or thousands of titles available for preview and purchase/recording at home without leaving one's chair has unparallel appeal to many audiophiles as well as those who simply enjoy music for relaxation and unwinding effect after a long workday. This convenience, however, has to be user-friendly and at the level which any Web user can enjoy. Namely, novice and expert users of the Internet, as well as anyone in between, has to be able to use the transfer of audio information from the Internet easily and quickly. For widespread appeal, it is important that Internet users be able to carry out this operation without any additional devices (whether internal or external hardware), complicated setups or any other complicated apparatus or techniques that can truly be relegated to the world of "computer wizards" or alike. For example, except for the intelligent device (such as the PC for example) for accessing the Internet, a sound (audio) card installed in the PC, and two cables for supplying the output information from the PC to a minidisk player/recorder, no additional devices should be present in the system for transferring and recording audio information to the minidisk player/recorder.

A need therefore exists for a system and method for realizing the above criteria.

OBJECTS OF THE INVENTION

It is an object of the present invention to provide a system for transferring data between a computer and a digital storage (recording) device.

It is another object of the present invention to provide a system for transferring audio and accompanying digital control data between a computer and a digital storage (recording) device using an audio card in the computer.

It is a further object of the present invention to provide a system for downloading data from the Internet and transferring the downloaded data to a digital storage (recording) device using an audio card.

SUMMARY OF THE INVENTION

These and other objects, features and advantages are accomplished by a system for transferring digital data. The inventive system comprises a computer including a programmable controller for processing input digital data, and a sound card for converting the processed digital data to analog form. The system also includes a recording device connected to the computer via at least one cable. The recording device includes a processor for receiving the converted data from the sound card via the cable and for converting the received data to digital form.

In accordance with one aspect of the present invention, the digital data in the system is comprised of audio data and non-audio data including text data or control data. The programmable controller in the computer adds a code to the input digital data for identifying the audio data.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which:

The FIGURE is a block diagram of the system for transferring digital data in accordance with the present invention.

DETAILED DESCRIPTION OF THE PREFERRED EMBODIMENTS

Figure 1:
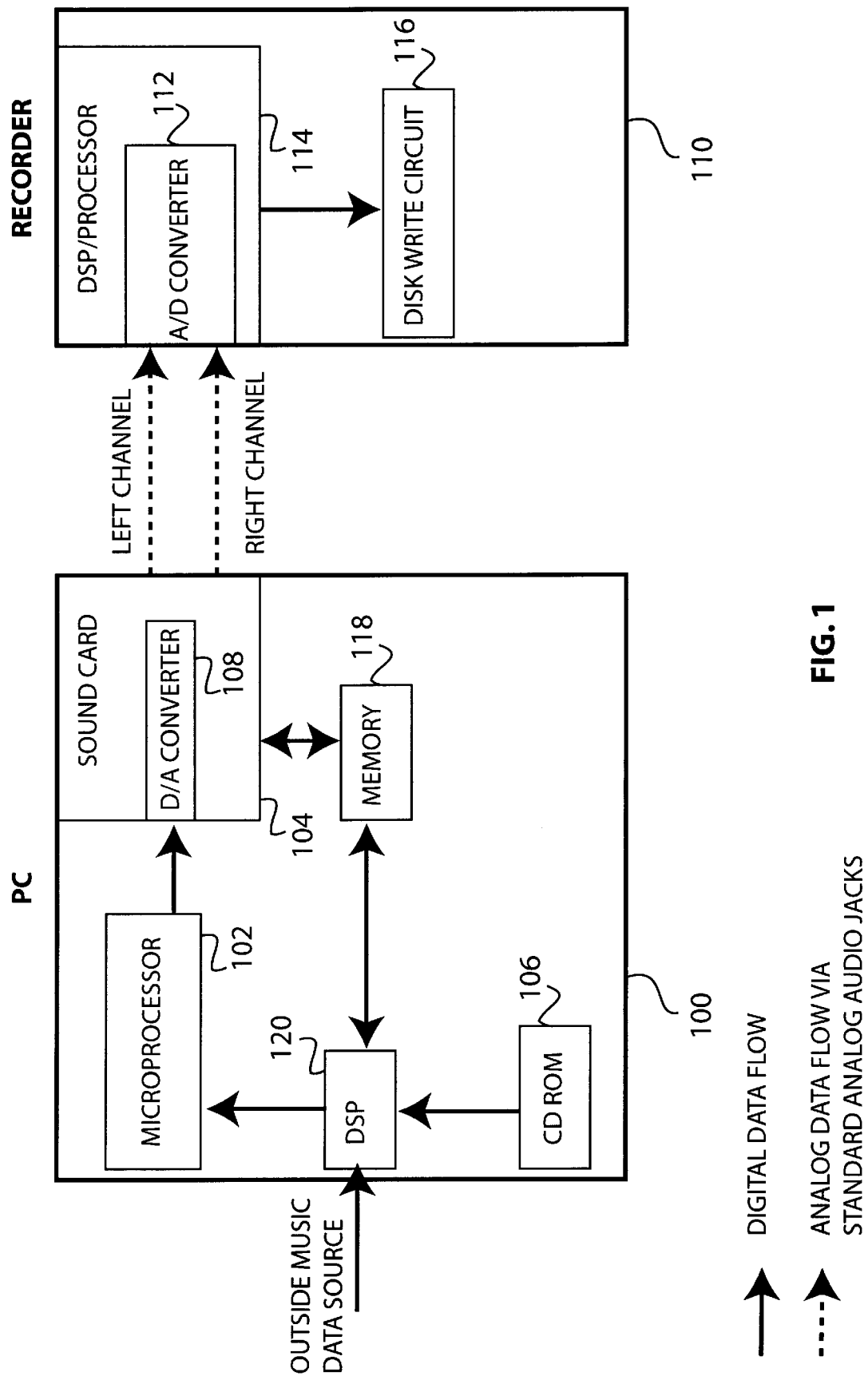

As a general overview, the present invention provides the transfer of digital data in analog form from a general purpose computer to a recording/reproducing device. The data is transferred via a sound (audio) card installed in the computer with audio output ports for two channels coupled to the input of the recording/reproducing device. Without any additional changes to the hardware of a typical computer setup, the digital data is transferred to the player/recorder for recording information to a recording medium and reproducing the recorded information from the recording medium at any time. A typical computer setup may include a computer (desktop, portable, etc.), a sound card installed in the computer and two cables for the output of the sound card.

The FIGURE shows a block diagram of a system according to the present invention. A personal computer 100 (PC) has typical components that include a microprocessor (programmable controller) 102, signal processing software in Random Access Memory (RAM) or imbedded in the microprocessor 102, as well as additional hardware and software components commonly found in a general purpose computer. Typically, a standard computer configuration includes a sound card 104 for reproducing audio information via external speakers, for example. The sound card 104 conventionally operates on data in analog form and has two output analog channels, left channel and right channel, as shown in the FIGURE. The computer 100 also has a CD-ROM drive 106 for reproducing information from compact disks (CD) and a digital signal processor (DSP) 120 for processing data retrieved from the CD. The use of the CD-ROM drive 106 and the DSP 120 in the current invention will be explained hereinbelow.

It is well known that the computer processes digital data (as opposed to analog data). As shown in the FIGURE, the sound card 104 has a digital-to-analog converter 108 for converting the digital data (as processed by the microprocessor 102 and other devices in the computer) to analog form. Once the digital data is converted to analog form, it can be output as analog data via the cables connected to the left and right channel output ports on the sound card 104. The output data converted to analog form may be, for example, audio data which is reproducible via external speakers connected to the sound card 104 via the cables.

The FIGURE further shows a minidisk player/recorder (device) 110 for reproducing and/or recording digital data to a minidisk. The minidisk device 110 contains conventional circuitry for processing digital data, writing the processed data to the minidisk (not shown) and reproducing the recorded data from the minidisk. To interface with external analog devices, the minidisk device 110 contains an analog-to-digital converter 112 for converting analog data to digital form. A DSP/processor 114 performs digital signal processing of the digital data including error correction, compression, etc. as known to those skilled in the art. Among other things, the minidisk device 110 also contains a disk write circuit 116 for writing the processed (compressed) data to a recording medium (minidisk).

The operation of the system as illustrated in block diagram form in the FIGURE will be explained next. The PC user accesses audio and non-audio information (data) on, for example, a CD using the CD-ROM drive 106 of the computer 100. The non-audio information may be text such as a title/track name, while the audio information may be a song. As understood by those skilled in the art, the data retrieved from the CD is in digital format and is compressed using any of the available compression standards and/or methods, such as a 5:1 compression ratio according to the ATRAC standard, for example. As well known in the art, the compression operation is widely used in order to achieve a high-speed transfer of a large data quantity in a reasonable amount of time. After the data, including the audio information and text, is transferred (downloaded) to the computer, it is stored in a storage device such as hard drive or RAM memory 118 in the computer under control of the microprocessor 102 and the DSP 120. By executing instructions in the digital signal processing software, the microprocessor 102 or the DSP 120 processes the stored data to correct for any errors during the transfer operation. Following the forward error correction of the data for correcting errors that could have occurred during transmission, the signal processing software is executed by the DSP 120 to transfer the data from the memory 118 to the sound card 104.

Alternatively, the memory 118 may not be used for data storage, and the data retrieved from the CD via the CD-ROM drive 106 may be transferred to the DSP 120 and then to the microprocessor 102. The compressed data is then supplied to the sound card 104 as shown in the FIGURE. As previously stated, the compressed data includes text and audio information. To distinguish between at least these two types of data, the microprocessor 102 writes a particular sequence of digital codes to the registers on the sound card 104. When reproduced by the sound card 104, this sequence of codes may sound like a continuous tone or a series of pulsed tones. It is understood that these tones may be in the audible range of RF spectrum, or alternatively above the audible range. The purpose of these codes (reproducible by the sound card 104 as tones, for example) is to identify the audio information. Namely, the audio information is identified as such for processing (by the minidisk device 110) which is different from the processing of text data. It is understood, of course, that the codes may be associated with the text data just as well. Namely, as long as the identifying information is inserted for distinguishing between various data types, it is immaterial whether the identifying information refers to the audio information or to the text accompanying the audio information.

Further, the sound card 104 is operative to receive the error corrected audio data and the identifying data as supplied by the microprocessor 102 and to convert the received data to analog form using the D/A converter 108. Under control of the microprocessor 102, the error corrected audio data and the identifying data are then supplied to the output ports on the sound card 104 and transferred to the minidisk device 110 via the two cables.

It will be appreciated that the audio and text information both remain in compressed form according to this illustrative embodiment.

Following the transmission by the computer 100 to the minidisk device 110, the non-audio, audio and identifying data (all in analog form) are transferred via cables to input ports in the minidisk device 110. From the input ports, the non-audio, audio and identifying data are supplied to the A/D converter 112, where they are converted into digital form.

The audio and text information being in compressed form are not processed for compression at the minidisk device 110, whereby significant savings in the processing time are achieved. This is because the audio and text information both are in compressed form and there is no need for further compression. The audio and text information under control of the DSP/processor 114 at the minidisk 110 are, therefore, sent directly to the disk write circuit 116 for recording to the minidisk. While other operations and components of the minidisk device 110 perform various functions associated with the processing and recording of the audio information and text on the minidisk, these operations and components are well known to those skilled in the art and are omitted for brevity and in order not to detract from the present invention.

It is understood, of course, that any non-audio (digital) data can be transferred for recording to a recording medium via the sound card 104 in the PC 100 using the above-described operation. For example, control data for controlling various operations in a recording/reproducing device can be transferred from the PC 100 to the recording/reproducing device via the sound card 104.

In another aspect of the invention, a system having the block diagram as shown in the FIGURE may be used for providing remote access to multimedia information over the Internet. The Internet is a group of interconnected networks with various servers attached to those networks for providing information to users (clients) on the Internet, as well known to people skilled in the art of network communications. Via the Internet, users around the world communicate with each other, access various information in databases, receive from those databases (download) information for personal use, etc. The World Wide Web (WWW) is probably the most interesting and widely used section of the Internet containing graphics images in addition to text.

A particular site, for example, is accessed for audio data including text and audio information. As understood by those skilled in the art, the audio information provided by the Web site is in digital format and is compressed using any of the available compression standards and/or methods, such as MP3, RealAudio, etc. As further known to those skilled in the art, the "Web" server program may include Hypertext Transfer Protocol (HTTP) and File Transfer Protocol (FTP)

programs for downloading and uploading text and control files between the user and the network server. These application-specific HTTP and FTP programs are pre-loaded in the PC 100 for providing the interface with the Internet servers.

The user establishes connection using a "Web" browser program on the PC 100. As known in the art, the "Web" browser provides graphical user interface (GUI) access to network servers, for example. Under microprocessor control, the Operating System (OS) establishes communication with the "Web" browser via Transmission Control Protocol/Internet Program (TCP/IP) protocol using TCP/IP stack. As known in the art, TCP/IP protocol was developed for linking dissimilar processors across dissimilar networks and is currently used for Internet communications.

The PC 100 is coupled to the Internet via a Network Interface Card (NIC)/modem. That is, the PC 100 establishes a node—via NIC/modem—on a particular network, which is a part of the Internet. The NIC serves as the interface for the PC 100 by setting up a communications path with users of various networks (via the Internet) in conformance with the Internet protocol. Alternatively, a dial-up modem may be used for logging on to the network by following the proper communications protocol, as well known in the art. The user then downloads the information from the Internet to the PC 100 and using the sound card 104 transfers the downloaded information for storage to a recording/playback device, as explained hereinabove.

It is understood, of course, that the present invention advantageously facilitates the processing of data by transferring the compressed (encoded) data directly to the recorder as described hereinabove with reference to the examples. Namely, the minidisk device 110 does not have to compress the data, which is already in compressed form, whereby the time to record the data to a minidisk is significantly reduced. That is, according to another aspect of the present invention, if data received by the PC 100 is not encoded (not compressed), the DSP 120 in the PC 100 encodes the received data for compression prior to transferring it to the sound card 108 and subsequently to the minidisk 110.

However, the present invention as described hereinabove with reference to the transfer of compressed (encoded) data is not limited thereto. According to yet another aspect of the present invention, non-compressed audio and non-audio data in digital form are transferred via the sound card 104 to the minidisk device 110 for recording to a storage medium. As shown in the FIGURE, the sound card 104, while operating on analog data, transfers the data between the two digital devices, such as the computer 100 and the minidisk device 110. The data received by the minidisk 110 may then be encoded (compressed) by the DSP/Processor 114 for recording to the minidisk.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A system for transferring digital data, comprising:
a computer including a programmable controller for processing input digital data representing audio and at least one of text and control data, and a sound card for converting the processed digital data to analog form; and a recording device connected to said computer via at least one cable, said recording device including a processor for receiving the converted data from said sound card via said at least one cable and for converting the received data to digital form.

2. The system according to claim 1, wherein said digital data is encoded for compression and supplied to said sound card in compressed form, and said sound card converts the compressed data directly to an analog signal to be transmitted via said at least one cable to the recording device.

3. The system according to claim 1, wherein said programmable controller in said computer adds a code to said input digital data for identifying said audio data, said code is converted to a specific analog signal by said sound card that is recognizable by the recording device to thereby identify said audio data.

4. The system according to claim 3, wherein said specific analog signal comprises at least one audio tone.

5. The system according to claim 1, wherein said computer is connected to a database for retrieving said digital data.

6. The system according to claim 5, wherein said database includes a data storage device for retrieving said digital data from a recording medium inserted in said data storage device.

7. The system according to claim 5, wherein said database is the Internet for retrieving said digital data using said computer.

8. The system according to claim 1, wherein said recording device records the converted data in digital form to a recording medium.

9. The system according to claim 1, wherein said programmable controller in said computer adds a code to said input digital data for identifying said text data, said code is converted to a specific analog signal by said sound card that is recognized by the recording device to thereby identify said text data.

10. The system according to claim 9, wherein said specific analog signal comprises at least one audio tone.

11. A computer comprising:
a programmable controller for processing digital data representing audio and at least one of text and control data; and, a sound card for converting the processed digital data including the text and/or control data to an analog signal;

whereby a recording device may be connected to said computer so as to receive the analog signal from said sound card via at least one cable and convert the received analog signal to digital form for recording on a record medium.

12. The computer according to claim 11, wherein said digital data is encoded for compression and supplied to said sound card in compressed form, and said sound card converts the compressed data directly to an analog signal to be transmitted via said at least one cable to a recording device.

13. A computer comprising:
a programmable controller for processing input digital data representing audio and outputting the processed digital data in compressed form; and, a sound card for converting the processed digital data in compressed form directly to an analog signal and outputting said analog signal;

whereby a recording device may be connected to said computer via at least one cable so as to receive the analog signal representing the compressed data and convert the received signal to digital form for direct recording on a record medium.

14. A recording device comprising:

receiving means for receiving an analog signal via at least one cable, said analog signal comprising digital data representing audio and at least one of text and control data converted to analog form by a sound card of a computer;

analog to digital (A/D) conversion means for converting the received analog signal to digital data;

processing means for processing the digital data converted by the A/D conversion means; and, recording means for recording the data processed by said processing means on a record medium.

15. The recording device according to claim 14 wherein said analog signal comprises compressed digital data converted to analog form by said sound card, said A/D conversion means converts the analog signal back to said compressed digital data which is recorded on said recording medium without processing it for compression.

16. The recording device according to claim 14 wherein said digital data represented by said analog signal contains a code for identifying at least one of said audio, said text and said control data, and said recording device includes means for recognizing said code to thereby identify the reception of said audio, text or control data.

17. The recording device according to claim 16, wherein said analog signal represents said code as at least one predetermined audio tone.

* * * * *